United States Patent
Kobashi

(10) Patent No.: US 9,092,144 B2
(45) Date of Patent: Jul. 28, 2015

(54) INFORMATION PROCESSING APPARATUS, STORAGE APPARATUS, INFORMATION PROCESSING SYSTEM, AND INPUT/OUTPUT METHOD

(71) Applicant: FUJITSU LIMITED, Kawasaki-shi, Kanagawa (JP)

(72) Inventor: Kyuu Kobashi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/088,566

(22) Filed: Nov. 25, 2013

(65) Prior Publication Data

US 2014/0173144 A1 Jun. 19, 2014

(30) Foreign Application Priority Data

Dec. 19, 2012 (JP) .................................. 2012-277129

(51) Int. Cl.
*G06F 3/06* (2006.01)
*H04L 29/06* (2006.01)

(52) U.S. Cl.
CPC .............. *G06F 3/061* (2013.01); *G06F 3/0611* (2013.01); *G06F 3/0635* (2013.01); *G06F 3/0655* (2013.01); *G06F 3/0673* (2013.01); *G06F 3/0685* (2013.01); *H04L 69/28* (2013.01)

(58) Field of Classification Search
CPC ...... H04L 69/28; H04L 47/10; G06F 2217/84
See application file for complete search history.

(56) References Cited

U.S. PATENT DOCUMENTS

| | | | |
|---|---|---|---|
| 2005/0240681 A1* | 10/2005 | Fujiwara et al. ................... | 710/1 |
| 2006/0200593 A1 | 9/2006 | Kambayashi et al. | |
| 2009/0235110 A1 | 9/2009 | Kurokawa | |

FOREIGN PATENT DOCUMENTS

| | | |
|---|---|---|
| JP | 2000-276824 | 10/2000 |
| JP | 2006-235843 | 9/2006 |
| JP | 2009-223702 | 10/2009 |

OTHER PUBLICATIONS

Office Action mailed Dec. 15, 2014 for corresponding Korean Patent Application No. 10-2013-0153871.

* cited by examiner

*Primary Examiner* — Hyun Nam
(74) *Attorney, Agent, or Firm* — Staas & Halsey LLP

(57) ABSTRACT

An input and output method includes connecting a storage apparatus to an information processing apparatus via a plurality of paths, storing management information for a timeout time of each of the plurality of paths in a storage unit of the storage apparatus, and acquiring the timeout time of a path and another path of an input/output issuance destination for the storage apparatus from the storage unit depending on the path and the another path.

14 Claims, 13 Drawing Sheets

FIG. 2

| APPARATUS IDENTIFICATION INFORMATION DEFAULT | DISK TYPE | CM COEFFICIENT | TIMEOUT TIME OF LEADING PATH | TIMEOUT TIME OF INTERMEDIATE PATH | TIMEOUT TIME OF FINAL PATH | UPPER LIMIT |
|---|---|---|---|---|---|---|
| DEFAULT | DEFAULT | 1.0 | 40 | 40 | 40 | 40 |

FIG. 3

| APPARATUS IDENTIFICATION INFORMATION DEFAULT ⌇41 | DISK TYPE ⌇42 | CM COEFFICIENT ⌇43 | TIMEOUT TIME OF LEADING PATH ⌇44 | TIMEOUT TIME OF INTERMEDIATE PATH ⌇45 | TIMEOUT TIME OF FINAL PATH ⌇46 | UPPER LIMIT ⌇47 |
|---|---|---|---|---|---|---|
| DEFAULT | DEFAULT | 1.0 | 40 | 40 | 40 | 40 |
| E4000 – 6A0299 | NEARLINE | 1.1 | 35 | 35 | 35 | 40 |
| E4000 – 6A0299 | HDD10000 | 1.2 | 30 | 35 | 35 | 40 |
| E4000 – 6A0299 | HDD15000 | 1.3 | 20 | 25 | 25 | 35 |
| E4000 – 6A0299 | SSD | 1.4 | 10 | 15 | 15 | 25 |

FIG. 4

| APPARATUS IDENTIFICATION INFORMATION DEFAULT 41 | DISK TYPE 42 | CM COEFFICIENT 43 | TIMEOUT TIME OF LEADING PATH 44 | TIMEOUT TIME OF INTERMEDIATE PATH 45 | TIMEOUT TIME OF FINAL PATH 46 | UPPER LIMIT 47 |
|---|---|---|---|---|---|---|
| DEFAULT | DEFAULT | 1.0 | 40 | 40 | 40 | 40 |
| E4000 – 6A0299 | NEARLINE | 1.1 | 35 | 35 | 40 | 40 |
| E4000 – 6A0299 | HDD10000 | 1.2 | 30 | 35 | 40 | 40 |
| E4000 – 6A0299 | HDD15000 | 1.3 | 20 | 25 | 30 | 35 |
| E4000 – 6A0299 | SSD | 1.4 | 10 | 15 | 20 | 25 |
| DX900 – 2D3334 | NEARLINE | 1.0 | 30 | 35 | 35 | 35 |
| DX900 – 2D3334 | HDD15000 | 1.0 | 15 | 20 | 35 | 35 |

FIG. 5

| DISK TYPE | CM COEFFICIENT | TIMEOUT TIME OF LEADING PATH | TIMEOUT TIME OF INTERMEDIATE PATH | TIMEOUT TIME OF FINAL PATH | UPPER LIMIT |
|---|---|---|---|---|---|
| NEARLINE | 1.1 | 35 | 35 | 40 | 40 |
| HDD10000 | 1.2 | 30 | 35 | 40 | 40 |
| HDD15000 | 1.3 | 20 | 25 | 30 | 35 |
| SSD | 1.4 | 10 | 15 | 20 | 25 |

| APPARATUS IDENTIFICATION INFORMATION DEFAULT 41 | DISK TYPE 42 | CM COEFFICIENT 43 | TIMEOUT TIME IN THE CASE IN WHICH THERE IS ALTERNATIVE PATH 48 | TIMEOUT TIME OF FINAL PATH 46 | UPPER LIMIT 47 |
|---|---|---|---|---|---|
| DEFAULT | DEFAULT | 1.0 | 40 | 40 | 40 |
| E4000 – 6A0299 | NEARLINE | 1.1 | 35 | 40 | 40 |
| E4000 – 6A0299 | HDD10000 | 1.2 | 30 | 40 | 40 |
| E4000 – 6A0299 | HDD15000 | 1.3 | 20 | 30 | 35 |
| E4000 – 6A0299 | SSD | 1.4 | 10 | 20 | 25 |

| APPARATUS IDENTIFICATION INFORMATION DEFAULT | DISK TYPE | CM COEFFICIENT | TIMEOUT TIME OF LEADING PATH | TIMEOUT TIME OF SECOND PATH | ... | TIMEOUT TIME OF FINAL PATH | UPPER LIMIT |
|---|---|---|---|---|---|---|---|
| DEFAULT | DEFAULT | 1.0 | 40 | 40 | | 40 | 40 |
| E4000 – 6A0299 | NEARLINE | 1.1 | 35 | 35 | | 40 | 40 |
| E4000 – 6A0299 | HDD10000 | 1.2 | 30 | 35 | | 40 | 40 |
| E4000 – 6A0299 | HDD15000 | 1.3 | 20 | 25 | | 30 | 35 |
| E4000 – 6A0299 | SSD | 1.4 | 10 | 15 | | 20 | 25 |

INFORMATION PROCESSING APPARATUS, STORAGE APPARATUS, INFORMATION PROCESSING SYSTEM, AND INPUT/OUTPUT METHOD

CROSS-REFERENCE TO RELATED APPLICATION

This application is based upon and claims the benefit of priority from the prior Japanese Patent Application No. 2012-277129 filed on Dec. 19, 2012, the entire contents of which are incorporated herein by reference.

FIELD

The present disclosure relates to an information processing apparatus, a storage apparatus, an information processing system, and an input/output method.

BACKGROUND

A solid state drive (SSD) or high-performance storage that does not require a physical operation has been developed with the recent advancement of technology.

With the emergence of various technologies, such as information lifetime management (ILM), in which new information is stored on a high-speed disk and old information is stored on a low-speed, low-price disk, hierarchization, and virtualization, it has been generally accepted that various kinds of disks are mixed in a storage apparatus. For this reason, for example, a fast accessible storage such as SSD and a hard disk drive (HDD) having a low access speed may often coexist in a storage apparatus.

FIG. 13 is a diagram illustrating a storage system 101 according to the related art.

In the storage system 101 as illustrated in FIG. 13, for example, a plurality of storage apparatuses 110 and 120 are communicably connected to a server 102 via paths 130-1 to 130-6.

The server 102 may be an information processing apparatus which writes or reads data to or from a volume of the connected storage apparatuses 110 and 120. For example, the server 102 performs a data access request for a read or write command to the volume of the storage apparatuses 110 and 120. The storage apparatuses 110 and 120 perform data access to the volume depending on the data access request and respond to the server 102. The server 2 includes, for example, a central processing unit (CPU), a random access memory (RAM), and a read-only memory (ROM), which are not illustrated. Further, the server 102 includes a multi-path driver unit 103, logical unit number (LUN) information 107-1 to 107-6, and host bus adaptors (HBA) 109-1 to 109-6.

The multi-path driver unit 103 switches an access path to retry input/output (IO) when an IO timeout occurs, under a multi-path environment in which a plurality of paths to the storage apparatuses 110 and 120 are present. The IO timeout represents an exceeding of a timeout time (referred to as a timeout value), which is the maximum wait time from when the IO command is issued until a response to the IO command is returned.

The LUN information 107-1 to 107-6 is information about the LUNs of the storage apparatuses 110 and 120 which are connected to the server 102. For each LUN, for example, the disk type of the LUN (e.g., "SSD"), or apparatus identification information (e.g., "A4000-6A0298"), are stored in the LUN information 107-1 to 107-6.

The HBAs 109-1 to 109-6 are adaptors which connect the server 102 to external devices such as, for example, the storage device. Examples of the HBAs 109-1 to 109-6 may include an SCSI adaptor, a fiber channel (FC) adaptor, and a serial ATA adaptor. Alternatively, the HBAs 109-1 to 109-6 may be a device which connects apparatuses based on IDE, Ethernet (registered mark), FireWire (registered mark), universal serial bus (USB), or the like.

The storage apparatus 110 provides a storage area for the server 102 and is, for example, an RAID apparatus. In an example in FIG. 13, the storage apparatus 110 has "A4000" as an apparatus name and "6A0298" as an ID. The storage apparatus 110 includes controller modules (CM) 111-1 and 111-2 and disks 113-1 to 113-4.

The CM 111-1 includes, for example, a CPU, a memory, and a cache memory, which are not illustrated, in addition to channel adapters 112-1 and 112-2, and performs IO processing.

The CM 111-2 includes, for example, a CPU, a memory, and a cache memory, which are not illustrated, in addition to CAs 112-3 and 112-4, and performs IO processing.

In this configuration, the CM 111-1 and the CM 111-2 have the same configuration. Further, the CA 112-1 to CA 112-4 have the same configuration.

The CAs 112-1 to 112-4 are interface controllers communicably connected to the server 102 and may be, for example, fiber channel adapters. The CAs 112-1, 112-2, and 112-4 are respectively connected to the HBAs 109-1 to 109-3 of the server via of the respective paths 130-1 to 130-3.

The paths 130-1 to 130-3 connect the server 102 to the storage apparatus 110, and may be, for example, fiber channels.

The disks 113-1 to 113-4 are storage apparatuses able to store information and include, for example, a near-line drive (hereinafter, referred to as a nearline) 113-1, HDDs 113-2 and 113-3, and an SSD 113-4. Strictly speaking, the SSD is not a disk, but for convenience of explanation, the SSD is also handled as a disk, like the nearline or the HDD.

The nearline 113-1 is a storage drive which uses a disc, to which a magnetic substance has been applied, as a recording medium and moves a magnetic head to read and write information from and to a disc, which rotating at high speed. The nearline 113-1 generally has a capacity larger than the capacity of the HDDs 113-2 and 113-3, but has a reduced access speed.

The HDDs 113-2 and 113-3 are each a storage drive which uses a disc to which a magnetic substance has been applied as a recording medium and moves a magnetic head to read and write information from and to the disc, which is rotating at high speed.

The SSD 113-4 is a storage drive which uses a semiconductor device memory as a storage apparatus and is referred to as a silicon disk drive or a semiconductor disk drive. Since an SSD 33 does not generally have a head seek time accompanied by the movement of the magnetic head such as the nearline 113-1 and the HDDs 113-2 and 113-3, the SSD 33 may perform random access at a higher speed than the nearline 113-1 and the HDDs 113-2 and 113-3. However, since the SSD 33 uses semiconductor memory, the SSD 33 is generally more expensive than the nearline 113-1 or the HDDs 113-2 and 113-3.

The storage apparatus 120 provides a storage area for the server 102 and may be, for example, an RAID apparatus. In the example of FIG. 13, the storage apparatus 120 has "A3000" as an apparatus name and "4A0290" as an ID. The storage apparatus 120 includes CMs 121-1 and 121-2 and disks 123-1 and 123-2.

The CM 121-1 includes, for example, a CPU, a memory, and a cache memory, which are not illustrated, in addition to the CAs 122-1 and 122-2, and performs IO processing.

The CM 121-2 includes, for example, a CPU, a memory, and a cache memory, which are not illustrated, in addition to the CAs 122-3 and 122-4, and performs the IO processing.

The CAs 122-1 to 122-4 are each an interface controller communicably connected to the server 102, and may be, for example, a fiber channel adapter. The CAs 122-1, 122-2, and 122-4 are respectively connected to the HBAs 109-4 to 109-6 of the server via of the respective paths 130-4 to 130-6.

Here, the CM 121-1 and the CM 121-2 have the same configuration. Further, the CAs 122-1 to CA 122-4 have the same configuration.

The paths 130-4 to 130-6 are each a path which connects the server 102 to the storage apparatus 120 and may be, for example, an FC.

The disks 123-1 and 123-2 are each a storage apparatus able to store information, and may be, for example, the HDDs 123-1 and 123-2.

The HDDs 123-1 and 123-2 are each a storage drive which uses a disc to which a magnetic substance has been applied as a recording medium and moves a magnetic head to read and write information from and on the disc, which is rotating at high speed.

In the storage system 101, the IO access is generated for the storage apparatuses 110 and 120 from the server 102.

In this configuration, the server 102 side sets a timeout time (hereinafter, the timeout time is referred to as "IO timeout time") which is a maximum time to wait for a response from the storage apparatuses 110 and 120 after the server 102 issues an IO request.

When there is no response from the storage apparatuses 110 and 120 even after the time set in the server 102 side passes the IO timeout time due to, for example, failure of the storage apparatuses 110 and 120, the server 102 assumes that a timeout error has occurred and performs error processing.

The latency from after the server 102 issues the IO to the storage apparatuses 110 and 120 until the storage apparatuses 110 and 120 reply becomes, for example, the total sum of IO request transmission time, disk seek time, read/write time, IO transmission time and the like.

When the server 102 sets the IO timeout time to be short, the error detection or the path switching time when the storage apparatuses 110 and 120 fail may be short. However, when the IO timeout time is short, a timeout will unfortunately be detected when a latency value becomes longer than usual due to, for example, a temporary increase in the load of the storage apparatuses 110 and 120 even when the storage apparatuses 110 and 120 are operating normally.

The server 102 may set one IO timeout time. For example, in the Solaris (registered mark) standard driver, the default value of the IO timeout time is 60 seconds. To change the value, a user rewrites the definition and restarts the server 102.

As an example of the prior art, see for example Japanese Patent Application Laid-Open No. 2006-235843.

Since the SSD 113-4 has a short access time, the SSD 113-4 may set the IO timeout time to a short value.

However, as described above, there is one set IO timeout value in the storage apparatuses 110 and 120 in the related art. Therefore, when the same IO timeout value is used for both the faster disk 113 and the slower disk 113, and the IO timeout time is set to be less than 60 seconds to cooperate with the SSD, an IO timeout may frequently occur in the low-speed disk.

Even though there is a path for a switching destination of the IO, since path switching is performed after waiting a given time until the timeout, switching the path to another path and then immediately reissuing an IO command may not be possible.

An objective of one aspect of the present disclosure is to shorten a response time at the time of IO issuance for a storage apparatus.

Actions and effects that are derived by each component illustrated in the embodiments for carrying out the disclosure to be described below and cannot be obtained by the related art, may be considered as other objectives of the present application without being limited to the above objective.

SUMMARY

An input and output method includes connecting a storage apparatus to an information processing apparatus via a plurality of paths, storing management information for a timeout time of each of the plurality of paths in a storage unit of the storage apparatus, and acquiring the timeout time of a path and another path of an input/output issuance destination for the storage apparatus from the storage unit depending on the path and the another path.

According to the disclosed technology, it is possible to shorten the response time when issuing an IO request to a storage apparatus.

The object and advantages of the disclosure will be realized and attained by means of the elements and combinations particularly pointed out in the claims. It is to be understood that both the foregoing general description and the following detailed description are exemplary and explanatory, and are not restrictive of the disclosure as claimed.

BRIEF DESCRIPTION OF DRAWINGS

FIG. 2 is a diagram illustrating an initial state of a server-side timeout table according to an example of an embodiment of the present disclosure.

FIG. 3 is a diagram illustrating the server-side timeout table after a storage apparatus is identified according to an example of an embodiment of the present disclosure.

FIG. 4 is a diagram illustrating an example in which a record is further added to the server-side timeout table of FIG. 3.

FIG. 5 is a diagram illustrating a storage apparatus-side timeout table according to an example of an embodiment of the present disclosure.

FIG. 10 is a diagram illustrating a server-side timeout table according to a first modified example of an embodiment of the present disclosure.

DESCRIPTION OF EMBODIMENTS

Hereinafter, embodiments of the present disclosure regarding a storage system, a server, a storage apparatus, an input/output method, and an input/output program will be described with reference to the accompanying drawings. However, the embodiments to be described below are illustrative only, and it is not to be construed that various modified examples or technologies which are not specified in the embodiments are excluded. That is, the present embodiment may be implemented by being variously changed without departing from the spirit of the embodiment.

(A) System Configuration

Figure 1:
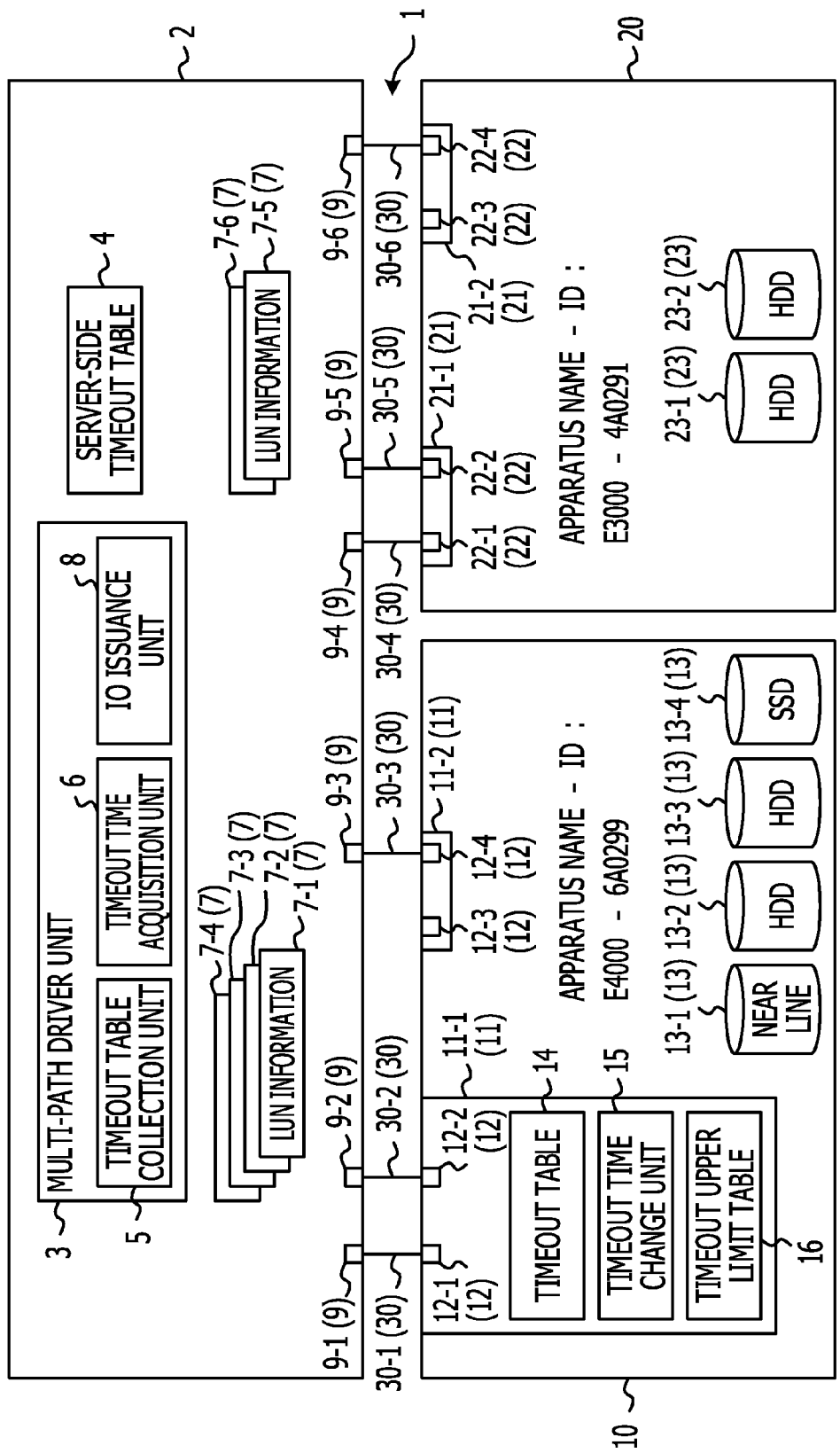
FIG. 1 is a diagram illustrating a configuration of a storage system according to an example of an embodiment of the present disclosure.

FIG. 1 is a diagram illustrating a configuration of a storage system (information processing system) 1 according to an example of an embodiment of the present disclosure. In the storage system 1 as illustrated in FIG. 1, a plurality of storage apparatuses 10 and 20 (e.g., two in the example illustrated in FIG. 1) are communicably connected to a server 2 via paths 30-1 to 30-6 with the storage apparatuses 10 and 20.

The server 2 is an information processing apparatus which writes or reads data in or from a volume of the connected storage apparatuses 10 and 20. For example, the server 2 performs a data access request for a read or a write with respect to a volume of the storage apparatuses 10 and 20. The storage apparatuses 10 and 20 perform the data access with respect to the volume in accordance with the data access request and respond to the server 2. The server 2 includes, for example, a central processing unit (CPU), a random access memory (RAM), and a read-only memory (ROM), which are not illustrated. Further, the server 2 includes a multi-path driver unit 3, a server-side timeout table (storage unit) 4, LUN information 7-1 to 7-6, and HBAs 9-1 to 9-6.

The multi-path driver unit 3 acquires timeout information from the storage apparatus 10 and switches an access path to retry IO when an IO timeout occurs in a multi-path environment. The multi-path driver unit 3 includes a timeout table collection unit 5 (a collecting unit), a timeout time acquisition unit 6 (an acquiring unit), and an IO issuance unit 8 (an issuing unit).

The timeout table collection unit 5 acquires a timeout table 14 to be described below from the storage apparatus 10, for which setting of IO timeout values may be performed by an external source. Further, data from the acquired timeout table 14 is written to the server-side timeout table 4. At this point, the timeout table collection unit 5 adds to the server-side timeout table 4 information such as a model name and a serial number of the storage apparatus 10 serving as the apparatus identification information.

Hereinafter, a storage apparatus for which IO timeout values may be set from an external apparatus such as the server 2 is called a 'timeout correspondence storage apparatus'. However, the storage apparatus which may not set the timeout values is called a 'timeout non-correspondence storage apparatus'. In the example illustrated in FIG. 1, the storage apparatus 10 may be the timeout correspondence storage apparatus and the storage apparatus 20 may be the timeout non-correspondence storage apparatus.

When an IO is issued to the storage apparatuses 10 and 20, the timeout time acquisition unit 6 refers to the server-side timeout table 4 to be described below to read and acquire the timeout time set in the IO. In the case of the timeout non-correspondence storage apparatus 20, the timeout time acquisition unit 6 reads a default timeout time (e.g., 40 seconds).

The IO issuance unit 8 issues the IO by using the timeout values acquired by the timeout time acquisition unit 6. Further, as described with reference to FIG. 8, the IO issuance unit 8 issues the IO and then determines whether the IO is timeout, normally ends, or abnormally ends due to other than the timeout.

The server-side timeout table 4 is a table which stores timeout times for each disk of the storage apparatus 10 connected to the server 2. The server-side timeout table 4 is stored in, for example, a memory (not illustrated) of the server 2. The server-side timeout table 4 will be described below with reference to FIGS. 2 to 4.

The LUN information 7-1 to 7-6 is information on the LUNs of the storage apparatuses 10 and 20 which is connected to the server 2. For each LUN, for example, a disk type (e.g., "SSD") of the LUN, or apparatus identification information (e.g., "E4000-6A0299") are stored in the LUN information 7-1 to 7-6.

The HBAs 9-1 to 9-6 are each an adaptor which connects the server 2 to external devices such as the storage device. Examples of the HBAs 9-1 to 9-6 may include an SCSI adaptor, a fiber channel (FC) adaptor, and a serial ATA adaptor. Alternatively, the HBAs 9-1 to 9-6 may be a device which connects apparatuses based on the IDE, the Ethernet, the FireWire, and the USB.

Hereinafter, reference numerals 7-1 to 7-6 are used as reference numerals representing the LUN information when there is a need to specify one of the plurality of LUN information, but reference numeral 7 is used when there is a need to specify any LUN information.

The storage apparatus 100 provides a storage area for the server 2 and may be, for example, a RAID apparatus. The storage apparatus 10 is a type which may set the IO timeout values from the outside. Further, in the example of FIG. 1, the storage apparatus 10 has "E4000" as an apparatus name and "6A0299" as an ID. The storage apparatus 10 includes CMs (transmitting units) 11-1 and 11-2, disks 13-1 to 13-4, a timeout table (storage unit) 14, a timeout time changing unit 15, and a timeout upper limit table 16.

The CM 11-1 includes, for example, a CPU, a memory, and a cache memory, which are not illustrated, in addition to CAs 12-1 and 12-2, and performs the IO processing.

The CM 11-2 includes, for example, a CPU, a memory, and a cache memory, which are not illustrated, in addition to CAs 12-3 and 12-4, and performs the IO processing.

The CAs 12-1 to 12-4 are each an interface controller communicably connected to the server 2 to be communicative and may be, for example, a fiber channel adapter. The CAs 12-1, 12-2, and 12-4 are each connected to the HBAs 9-1 to 9-3 of the server via each of the paths 30-1 to 30-3.

In this configuration, the CM 11-1 and the CM 11-2 have the same configuration. Further, the CAs 12-1 to CA 12-4 have the same configuration.

The paths 30-1 to 30-3 are each a path which connects the server 2 to the storage apparatus 10 and may be, for example, an FC.

The disks 13-1 to 13-4 are each a storage apparatus which may store information and includes, for example, a near-line 13-1, HDDs 13-2 and 13-3, and an SSD 13-4.

The nearline 13-1 is a storage drive which uses a disk applied with a magnetic substance as a recording medium and moves a magnetic head to read and write information from and on the disk rotating at a high speed. The nearline 13-1 generally has a capacity larger than that of the HDDs 13-2 and 13-3, but has a reduced access speed.

The HDDs 13-2 and 13-3 are each a storage drive which uses a disk applied with a magnetic substance as a recording medium and moves a magnetic head to read and write information from and on the disk rotating at a high speed.

The SSD 13-4 is a storage drive which uses a semiconductor device memory as the storage apparatus and is referred to as a silicon disk drive or a semiconductor disk drive. Since an SSD 33 does not generally have a head seek time accompanied by the movement of the magnetic head such as the nearline 13-1 and the HDDs 13-2 and 13-3, the SSD 33 may perform a random access at a higher speed than the nearline 113-1 and the HDDs 13-2 and 13-3. However, since the SSD 33 uses the semiconductor memory, the SSD 33 is generally more expensive than the nearline 13-1 or the HDDs 13-2 and 13-3.

The timeout table 14 is a table storing the timeout times for each disk 13 which is included in the storage apparatus 10. The timeout table 14 is stored in, for example, memories (not illustrated) of the CMs 11-1 and 11-2. The timeout table 14 will be described below with reference to FIG. 5.

When a delay processing occurs due to, for example, a high load of the storage apparatus 10, the frequent occurrence of the IO timeout error is not desirable.

Therefore, the timeout time changing unit 15 monitors a load state of the storage apparatus 10 to increase the values of the timeout time which are set in the timeout table 14 when the occurrence of the timeout is expected due to, for example, a maintenance, and a high load in the storage apparatus 10. In this case, the timeout time changing unit 15 sets the timeout times for each path 30 by setting the upper limit values, which are set in the timeout upper limit table 16 to be described below, to upper limits. Further, the timeout time changing unit 15 uses a sense to notify the server 2 of the updating of the timeout table 14.

The sense herein is a message used to notify the server 2 when the storage apparatuses 10 and 20 respond to the IO from the server 2. The sense is a well-known method in the art and the description thereof will be omitted.

The timeout time changing unit 15 changes the values set in the timeout table 14, even when the high load state of the storage apparatus 10 is resolved or firmware is updated. Even in this case, the timeout time changing unit 15 uses the sense to notify the server 2 of the fact that the timeout table 14 is updated.

The processing of change of these timeout times and notification to the server 2 will be described below with reference to FIG. 9.

The timeout upper limit table 16 is a table storing the upper limit values of the timeout times which may be set in each of the disks 13 and paths 30 which is included in the storage apparatus 10. The timeout upper limit table 16 will be described below with reference to FIG. 6.

The storage apparatus 20 also provides a storage area for the server 2 and may be, for example, an RAID apparatus. The storage apparatus 20 is a type which may not set the timeout values from the outside. Further, in the example of FIG. 1, the storage apparatus 20 has "E3000" as an apparatus name and "4A0291" as an ID. The storage apparatus 20 includes, for example, CMs 21-1 and 21-2 and disks 23-1 and 23-2.

The CM 21-1 includes, for example, a CPU, a memory, and a cache memory, which are not illustrated, in addition to CAs 22-1 and 22-2, and performs the IO processing.

The CM 21-2 includes, for example, a CPU, a memory, and a cache memory, which are not illustrated, in addition to CAs 22-3 and 22-4, and performs the IO processing.

The CAs 22-1 to 22-4 are each an interface controller communicably connected to the server 2, and may be, for example, a fiber channel adapter. The CAs 22-1, 22-2, and 22-4 are each connected to the HBAs 9-4 to 9-6 of the server via each of the paths 30-4 to 30-6.

In this configuration, the CM 21-1 and the CM 21-2 have the same configuration. Further, the CA 22-1 to CA 22-4 have the same configuration.

The paths 30-4 to 30-6 are each a path which connects the server 2 to the storage apparatus 20 and may be, for example, an FC.

The disks 23-1 and 23-2 are each a storage apparatus which may store the information, and may be, for example, the HDDs 23-1 and 23-2.

The HDDs 23-1 and 23-2 are each a storage drive which uses a disk applied with a magnetic substance as a recording medium and moves a magnetic head to read and write information from and on the disk rotating at a high speed.

Hereinafter, as reference numerals representing the CM included in the storage apparatus 10, reference numerals 11-1 and 11-2 are used when there is a need to specify one of the plurality of CMs, but reference numeral 11 is used when there is a need to specify any CM.

As reference numerals representing the CA included in the storage apparatus 10, reference numerals 12-1 to 12-4 are used when there is a need to specify one of the plurality of CAs, but reference numeral 12 is used reference numeral 12 is used when there is a need to specify any CA.

As reference numerals representing the disk included in the storage apparatus 10, reference numerals 13-1 to 13-4 are used when there is a need to specify one of the plurality of disks, but reference numeral 13 is used when there is a need to specify any disk.

As reference numerals representing the CM included in the storage apparatus 20, reference numerals 21-1 and 21-2 are used when there is a need to specify one of the plurality of CMs, but reference numeral 21 is used when there is a need to specify any CM.

As reference numerals representing the CA included in the storage apparatus 20, reference numerals 22-1 to 22-4 are used when there is a need to specify one of the plurality of CAs, but reference numeral 22 is used when there is a need to specify any CA.

As reference numerals representing the disk included in the storage apparatus 20, reference numerals 23-1 and 23-2 are used when there is a need to specify one of the plurality of disks, but reference numeral 23 is used when there is a need to specify any disk.

As reference numerals representing a path, reference numerals 30-1 to 30-6 are used when there is a need to specify one of the plurality of paths, but reference numeral 30 is used when there is a need to specify any path.

As the example illustrated in FIG. 1, two CMs 12 are included in the storage apparatus 10, but the embodiment of the present disclosure is not limited thereto, and the storage apparatus 10 may include more than three CMs 12.

Four disks 13 are included in the storage apparatus 10, but the embodiment of the present disclosure is not limited thereto, and the storage apparatus 10 may include the disks 13 which are three or more to five or less.

As the example illustrated in FIG. 1, two CMs 22 are included in the storage apparatus 20, but the embodiment of the present disclosure is not limited thereto, and the storage apparatus 20 may include more than three CMs 22.

Two disks 23 may be included in the storage apparatus 20, but the embodiment of the present disclosure is not limited thereto, and the storage apparatus 20 may include more than three disks 23.

Next, the server-side timeout table 4 included in the server 2 will be described with reference to FIGS. 2 to 4.

FIG. 2 is a diagram illustrating an initial state of the server-side timeout table 4 as an example of the embodiment of the present disclosure. Further, FIG. 3 is a diagram illustrating the server-side timeout table 4 after the storage apparatuses 10 and 20 are identified, as the example of the embodiment of the present disclosure. FIG. 4 is a diagram illustrating an example in which a record is added in the server-side timeout table 4 of FIG. 3.

The server-side timeout table 4 includes fields such as apparatus identification information 41, a disk type 42, a CM coefficient 43, a timeout time 44 of a leading path, a timeout time 45 of an intermediate path, a timeout time 46 of a final path, and an upper limit 47.

The apparatus identification information field 41 represents information identifying the storage apparatus 10. For example, the apparatus identification information field 41 is stored with a character string which connects a model name and a serial number of the storage apparatus 10.

The disk type field 42 represents a type of each disk 13 included in the storage apparatus 10. For example, as illustrated in FIG. 3, the disk type field 42 is stored with a character string which represents performance or characteristics of the disk, such as "HDD10000", "HDD15000", "SSD", and "NEARLINE". The "HDD10000" represents the HDD of which the rotating speed is 10,000 RPM and the "HDD15000" represents the HDD of which the rotating speed is 15,000 RPM. The "SSD" represents the SSD and the "NEARLINE" represents the nearline.

The timeout time field 44 of the leading path stores the timeout time which is used in the leading path in the case of the multi-path environment.

The timeout time field 45 of the intermediate path stores the timeout time in the path (hereinafter, the path is referred to as the "intermediate path") other than the leading path and the final path in the case of the multi-path environment.

The timeout time field 46 of the final path stores the timeout time which is used in the final path in the case of the multi-path environment.

The "leading path", the "intermediate path", and the "final path" do not necessarily coincide with a physical number of a path. Herein, a path first accessed at the time of the IO issuance is referred to as the "leading path", a path used at the time of a retry when the leading path is in an error state is referred to as the "intermediate path", and a path used at the time of a final retry (retry at a maximum retry frequency) is referred to as the "final path". Further, the leading path and the intermediate path are referred to as a "path other than final path".

Generally, at the time of the IO access, a path having the lowest load is selected at the time of the IO issuance and the IO is issued to the path.

For example, a configuration having four paths, physical paths #1 to #4, is considered.

(1) The first IO is issued to the physical path #2 having the lowest load among the physical paths #1 to #4.

(2) When the physical path #2 is in an error state, the path is switched and thus a first (initial) retry is performed. Among the physical paths #1, #3, and #4, the physical path #1 having the lowest load is selected.

(3) When the physical path #1 is also in an error state, the physical path #4 is selected at the time of a second retry.

(4) When the physical path #4 is also in an error state, the physical path #3 is selected at the time of a third retry.

Since the example describes the configuration having four paths, the retry at the physical path #3 becomes final.

In this case, the leading path becomes the physical path #2, the intermediate path becomes the physical paths #1 and #4 selected at the first and second retries, and the final path becomes the physical path #3 selected at the time of the final retry.

In the case in which the number of paths 30 is larger than the maximum retry frequency, even though the path 30 which is not yet retried remains, the retry at the maximum retry frequency becomes the final retry.

The reason why the timeout times of the leading path, the intermediate path, and the final path are set in the timeout time fields 44 to 46 will be described below.

The timeout of IO may occur due to the high load or the failure of the path 30. The timeout of IO may also commonly occur in the storage apparatus 10 due to, for example, the high load or the failure of the storage apparatus 10.

When the timeout which depends on the path 30 occurs, the path may be switched. In contrast, when the timeout occurs due to the high load of the storage apparatus 10, a response may put on hold. In the case of the failure of the storage apparatus 10, the IO does not succeed, and thus, an IO error state may be declared instantly.

However, it may not be determined from the server 2 whether the cause of the timeout is the path, the high load or the failure of the storage apparatus 10.

Therefore, according to the embodiment of the present disclosure, timeout times T1, T2, and T3 are individually set for each of the leading path, the intermediate path, and the final path, rather than setting one timeout time in the timeout table 14 of the storage apparatus 10. In this case, each of the timeout times is set so as to establish the relationship of T1≥T2>T3 between the respective timeout times of the leading path, the intermediate path, and the final path.

In detail, the timeout time T1 of the leading path is set to be a short value in consideration of the abnormality of the path, thereby switching the path in a short time.

The timeout time T2 of the intermediate path is set to be a short value in consideration of the possibility of the timeout due to the storage apparatus 10 even after the second path. Therefore, at the time of the high load of the storage apparatus 10, a response of a total time of the leading path and the second path waits, so that there is a high possibility of avoiding the occurrence of the IO error. Even in the case of the failure of the storage apparatus 10, the timeout time is set to be short, so that the total standby time may be shortened.

Assuming that it is the high load state, the timeout time T3 of the final path is set to be a longer value than T1 and T2 since the IO is likely to succeed if it can be waited a bit longer.

The upper limit field 47 represents an upper limit value of the timeout time of the storage apparatuses 10 and 20.

When the storage apparatus 10 is an exclusive CM type, the CM coefficient field 43 stores a CM coefficient (≥1) used when the IO is issued to the path which goes through a standby CM.

Herein, the storage apparatuses 10 and 20 are provided with a storage apparatus in which a normal access path for each LUN is fixed to one of the CMs 11 and 21 and a storage apparatus in which a normal access path for each LUN is not fixed to one of the CMs 11 and 21. The storage apparatus to which the access path is fixed is referred to as the 'exclusive CM type' and the storage apparatus to which the access path is not fixed is referred to as the "non-exclusive CM type'.

In the exclusive CM type storage apparatuses 10 and 20, the path connected to one of the CMs 11 and 21 is in an active state and the path connected to the other of the CMs 11 and 21 is in a standby state. In the normal access, only the path in the active state is used and the path in the standby state is not used. A CM connected to a path in the active state is referred to as an 'exclusive CM' and a CM connected to a path in the standby state is referred to as a 'standby CM'.

In contrast, in the non-exclusive CM type storage apparatuses 10 and 20, all the paths are in an active state, such that all the paths are used for the normal access.

As such, in the exclusive CM type storage apparatuses 10 and 20, since the storage apparatuses 10 and 20 have a performance difference according to whether the CMs 11 and 21 are the exclusive CM or the standby CM, it is considered whether the CMs 11 and 21 are the exclusive CM, even for the timeout time.

Although the performance difference is different for each storage apparatus 10 or 20, the performance difference is previously known information, and thus, the CM coefficient depending on a ratio of the performance difference is stored in the CM coefficient field 43.

It can be appreciated from the server 2 whether the accessing path goes through the exclusive CM. For this reason, when the IO is issued to the standby CM, the timeout time is set to a slightly longer value than that of the path which goes through the exclusive CM, by multiplying the timeout time of the timeout fields 44 to 46 to be described below by the CM coefficient.

It can be assumed that the configuration having four paths are provided, and among them, the two paths are connected to the exclusive CM 11 and the remaining two paths are connected to the standby CM 11, so that the paths access the SSD 13-4.

Referring to the fifth row of FIG. 4, in the SSD, 10 seconds are used as the timeout time of the leading path, and 15 seconds are used as the timeout time of the second path.

When the IO error occurs in both the leading path and the second path which are connected to the exclusive CM 11, a third path connected to the non-exclusive CM 11 is used.

In this case, in the timeout time of the third path at the standby CM side, 1.5×1.4=21 seconds is set from a value "15" of the timeout time field 45 of the intermediate path of FIG. 4 and a value "1.4" of the CM coefficient field 43. The timeout time of the fourth path which is the final path is 20×1.4=28 seconds, but since the timeout time exceeds the value "25 seconds" of the upper field 47, 25 seconds of the upper limit value is set.

When the server 2 starts, the server-side timeout table 4 illustrated in FIG. 2 is secured in the memory (not illustrated) of the server 2 by the timeout table collection unit 5. "40 seconds", which is a default timeout time used in the timeout non-correspondence storage apparatus 20, is set for all the paths in the server-side timeout table 4 in the initial state.

Next, when the storage apparatuses 10 and 20 are recognized, the timeout table collection unit 5 acquires the timeout table 14 from the storage apparatus 10 by using, for example, an inquiry command at the time of recognizing the storage apparatus 10 and adds data in the server-side timeout table 4.

Herein, the inquiry command is an SCSI command which is used to inquire a kind and a configuration of the SCSI apparatus to the SCSI apparatus and the function thereof is publicly known and therefore the description thereof will be omitted. Further, the multi-path driver unit 3 may use another command to inquire the storage apparatuses 10 and 20.

In this case, as described above, the timeout table collection unit 5 adds in the server-side timeout table 4 the information, such as, for example, the model name and the serial number of the storage apparatus 10, as the apparatus identification information. For example, the record as illustrated in FIG. 2 is added in the server-side timeout table 4 by the timeout table collection unit 5.

Next, for example, when another storage apparatus (not illustrated) is recognized, the record as illustrated in FIG. 2 is added in the server-side timeout table 4.

As described above, the timeout table 14 is added even in the storage apparatus 10.

FIG. 5 is a diagram illustrating the timeout table 14 at the storage apparatus 10 side as an example of the embodiment of the present disclosure.

The timeout table 14 has various fields such as a disk type 142, a CM coefficient 143, a timeout time 144 of a leading path, a timeout time 145 of an intermediate path, a timeout time 146 of a final path, and an upper limit 147.

The disk type field 142 represents the disk type within the storage apparatus 10. For example, as illustrated in FIG. 5, the disk type field 142 stores a character string which represents performance or characteristics of the disk, such as "HDD10000", "HDD15000", "SSD", and "NEARLINE". The "HDD10000" represents the HDD of which the rotating speed is 10,000 RPM and the "HDD15000" represents the HDD of which the rotating speed is 15,000 RPM. The "SSD" represents the SSD and the "NEARLINE" represents the nearline.

When the storage apparatus 10 is the exclusive CM type, the CM coefficient field 143 stores the CM coefficient used when the IO is issued to the standby CM.

The timeout time field 144 of the leading path stores the timeout time which is used in the leading path in the case of the multi-path environment.

The timeout time field 145 of the intermediate path stores the timeout time which is used in the leading path in the case of the multi-path environment.

The timeout time field 146 of the final path stores the timeout time which is used in the final path in the case of the multi-path environment.

When the storage apparatus 10 is, for example, in a high load state, the upper limit field 147 represents an upper limit value of a range in which the timeout time of the storage apparatus 10 may be changed.

The fields 144 to 147 are each set in advance with optimal values at the time of releasing the storage apparatus 10 from a factory to meet characteristics, such as the performance of the storage apparatus 10. Further, each value of the fields 144 to 147 may be changeable later by, for example, an operator.

Figure 6:
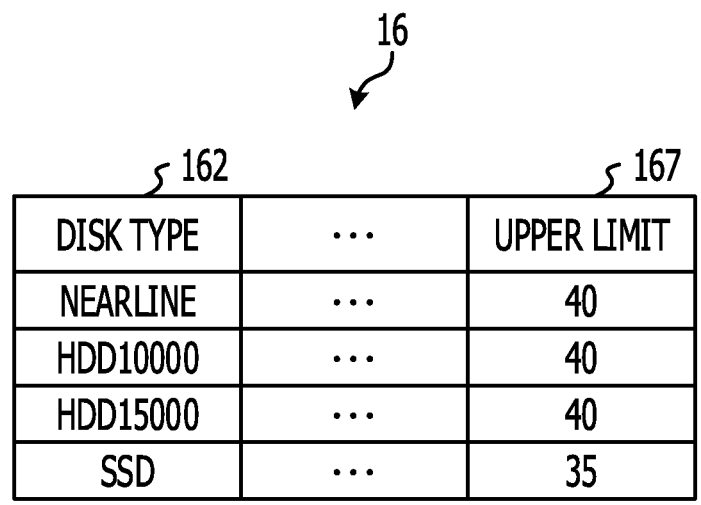
FIG. 6 is a diagram illustrating a timeout upper limit table according to an example of an embodiment of the present disclosure.

FIG. 6 is a diagram illustrating the timeout upper limit table 16 as an example of an embodiment of the present disclosure.

The timeout upper limit table 16 includes a disk type field 162 and an upper limit field 167.

The disk type field 162 represents the disk type within the storage apparatus 10. For example, as illustrated in FIG. 6, the disk type field 162 stores a character string which represents performance or characteristics of the disk, such as "HDD10000", "HDD15000", "SSD", and "NEARLINE". The "HDD10000" represents the HDD of which the rotating speed is 10,000 RPM and the "HDD15000" represents the HDD of which the rotating speed is 15,000 RPM. The "SSD" represents the SSD and the "NEARLINE" represents the nearline.

When the storage apparatus 10 is, for example, in a high load state, the upper limit field 167 represents an upper limit value of a range in which the timeout time of the storage apparatus 10 may be changed.

The upper limit field 167 is set in advance with optimal values at the time of releasing the storage apparatus 10 from a factory to meet characteristics, such as the performance of the storage apparatus 10. Further, the upper limit field 167 may be changeable later by an operator, and the like.

In the server 2, programs for implementing the functions serving as the multi-path driver unit 3, the timeout table collection unit 5, the timeout time acquisition unit 6, and the IO issuance unit 8 are provided in the form of being recorded in a computer-readable recording medium, such as, for example, a flexible disk, a CD (e.g., CD-ROM, and CD-RW), a DVD (e.g. DVD-ROM, DVD-RAM, DVD-R, DVD+R, DVD-RW, DVD+RW, and HD DVD), a Blu-ray disk, a magnetic disk, an optical disk, a magneto-optical disk. Further, the computer reads the programs from the recording medium to be transmitted, stored, and used in an internal storage apparatus or an external storage apparatus. Further, the programs may be recorded in storage apparatuses (recording medium), such as, for example, the magnetic disk, the optical disk, and the magneto-optical disk, and may be provided to the computer from the storage apparatus via a communication path.

In the storage apparatus 10, programs for implementing the function serving as the timeout time changing unit 15 are provided in the form of being recorded in a computer-readable recording medium, such as, for example, a flexible disk, a CD (e.g., CD-ROM, CD-R, and CD-RW), a DVD (e.g., DVD-ROM, DVD-RAM, DVD-R, DVD+R, DVD-RW, DVD+RW, and HD DVD), a Blu-ray disk, a magnetic disk, an optical disk, a magneto-optical disk. Further, the computer reads the programs from the recording medium to be transmitted, stored, and used in an internal storage apparatus or an external storage apparatus. Further, the programs may be recorded in storage apparatuses (recording medium), such as the magnetic disk, the optical disk, and the magneto-optical disk, and may be provided to the computer from the storage apparatus via a communication path.

When the functions serving as the multi-path driver unit 3, the timeout table collection unit 5, the timeout time acquisition unit 6, and the ID issuance unit 8 are to be realized, the programs stored in the internal storage apparatus (in the embodiment of the present disclosure, RAM or ROM (not illustrated) of the server 2) may be executed by a microprocessor of the computer (e.g., the CPU (not illustrated) of the server 2). In this case, the programs recorded in the recording medium may be read by the computer so as to be executed.

When the function serving as the timeout time changing unit 15 is to be realized, the programs stored in the internal storage apparatus (e.g., RAM or ROM (not illustrated) of the storage apparatus 10) are executed by a microprocessor of the computer (e.g., the CM 11 of the storage apparatus 10). In this case, the programs recorded in the recording medium may be read by the computer so as to be executed.

In the embodiment of the present disclosure, a computer is a concept including hardware and OS, and refers to a hardware which is operated under a control of the OS. Further, when the OS is unnecessary and the hardware is operated only by application programs, the hardware itself corresponds to the computer. The hardware includes at least a microprocessor, such as a CPU and a unit for reading computer programs recorded in a recording medium. In the embodiment of the present disclosure, the server 2 and the CM 11 function as the computer.

(B) Operation

The operation of the storage system 1 will be described next with reference to FIGS. 7 to 9.

First, the processing at the time of starting the multi-path driver unit 3 will be described with reference to FIG. 7.

Figure 7:
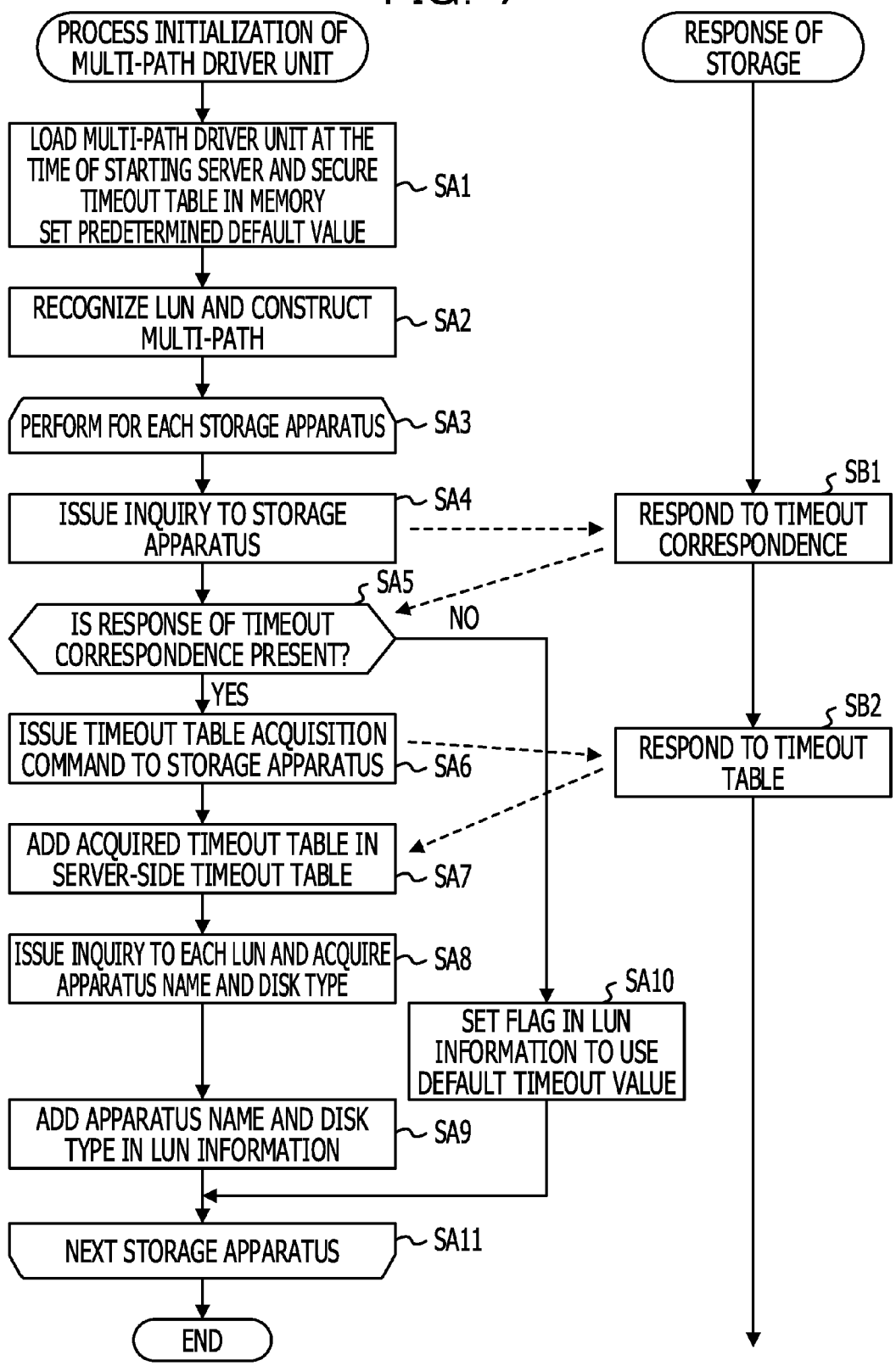
FIG. 7 is a flow chart illustrating initialization processing according to an example of an embodiment of the present disclosure.

FIG. 7 is a flow chart (SA11, SB1, and SB2 from step SA1) illustrating the initialization processing as an example of the embodiment of the present disclosure.

At step SA1, the server 2 starts and the multi-path driver unit 3 is loaded, so that the server-side timeout table 4 is secured in, for example, the memory (not illustrated) of the server 2.

At step SA2, the multi-path driver unit 3 recognizes LUN of the storage apparatuses 10 and 20 and constructs the multi-path. In this case, the multi-path driver unit 3 acquires the disk type of the storage apparatuses 10 and 20 as the inquiry command, and the like. Further, the multi-path driver unit 3 records the acquired disk type in the LUN information 7 (see, for example, FIG. 1).

The timeout table collection unit 5 then performs the processing of the following steps SA3 to SA11 on each of the storage apparatuses 10 and 20 which are connected to the server 2.

First, at step SA4, the timeout table collection unit 5 issues, for example, the inquiry command to the storage apparatuses 10 and 20 and inquires whether the storage apparatuses 10 and 20 correspond to the timeout.

At step SB1, the storage apparatus 10 returns information representing that the storage apparatus 10 corresponds to the timeout, as a response of the inquiry command. However, the timeout non-correspondence storage apparatus 20 does not return such information.

At step SA5, the timeout table collection unit 5 determines whether a response representing the timeout correspondence returns from the storage apparatuses 10 and 20.

When the response representing the timeout correspondence returns (see the YES route of step SA5), the timeout table collection unit 5 issues the command for acquiring the timeout table 14 to the storage apparatus 10 at step SA6.

At step SB2, the storage apparatus 10 transmits the timeout table 14 to the server 2.

At step SA7, the timeout table collection unit 5 acquires the timeout table 14 from the storage apparatus 10 and adds the data of the acquired timeout table 14 to the server-side timeout table 4 which is secured at step SA1.

At step SA8, the timeout table collection unit 5 issues the inquiry command to each LUN of the storage apparatus 10, and acquires the apparatus name and the disk type.

At step SA9, the timeout table collection unit 5 adds the apparatus name and the disk type acquired at step SA8 in the LUN information 7 of the timeout table collection unit 5.

However, when the response representing the timeout correspondence does not return (see the No route of step SA5), since the storage apparatus 20 is a non-correspondence storage apparatus, the timeout table collection unit 5 sets a flag in the LUN information 7 at step SA10 so as to allow the storage apparatus 20 to use the default timeout value.

The timeout table collection unit 5 acquires the information on all the storage apparatuses 10 and 20 by performing the processing of steps SA3 to SA11 on all the storage apparatuses 10 and 20 connected to the server 3.

Next, the processing at the time of issuing and responding to the will be described with reference to FIG. 8.

Figure 8:
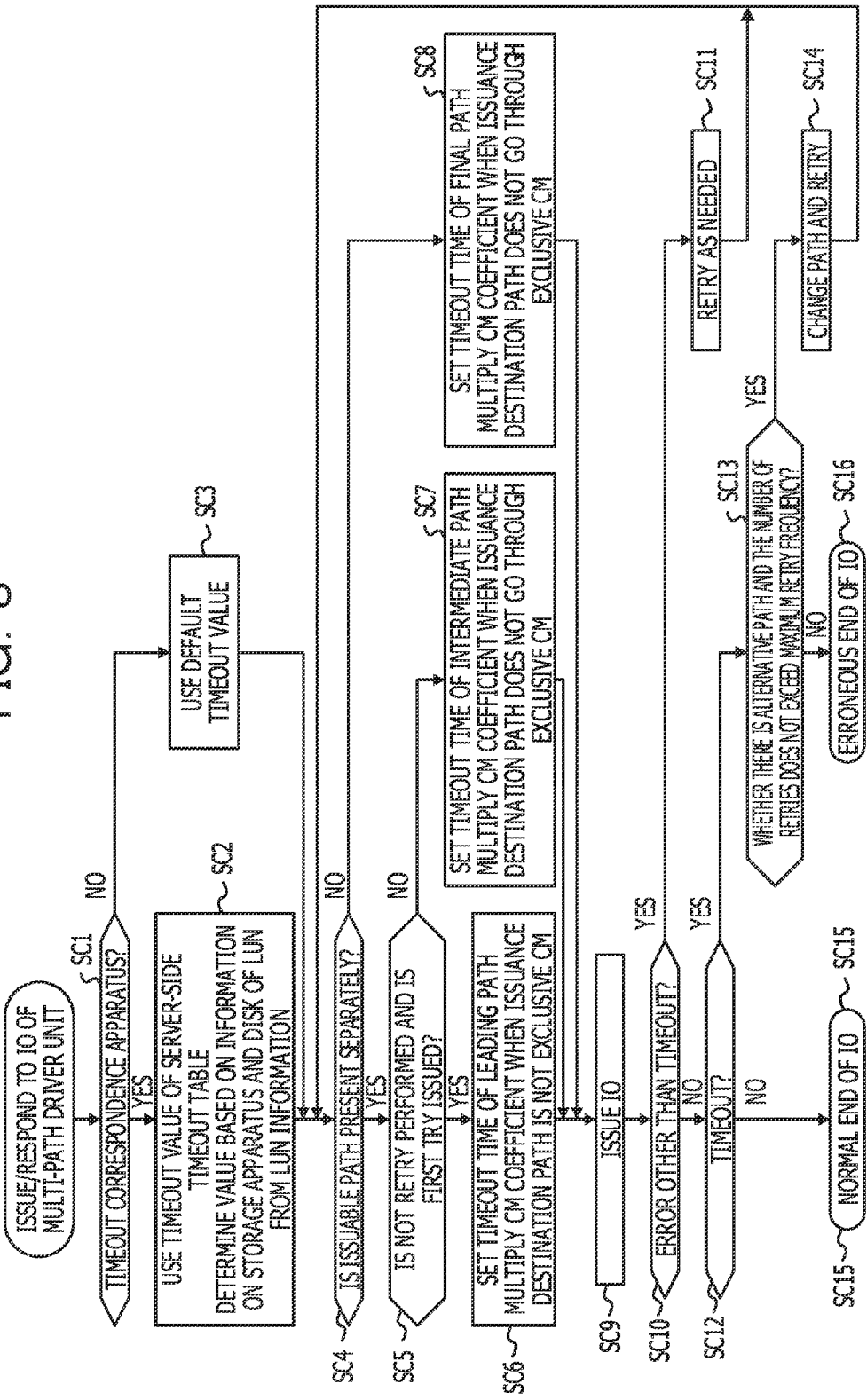
FIG. 8 is a flow chart illustrating processing at the time of issuing and responding to an IO request according to an example of an embodiment of the present disclosure.

FIG. 8 is a flow chart illustrating the processing at the time of issuing and responding to the IO as an example of an embodiment of the present disclosure (steps SC1 to SC16).

At step SC1, the timeout time acquisition unit 6 determines whether the storage apparatuses 10 and 20, which intend to issue the IO, are the timeout correspondence storage apparatus. In this case, the timeout time acquisition unit 6 investigates whether the apparatus information and the disk type are present in the LUN information 7 and if so, determines that the storage apparatuses are the timeout correspondence storage apparatus.

In the case of the timeout correspondence storage apparatus (see the YES route of step SC1), the timeout time acquisition unit 6 refers to the server-side timeout table 4 to acquire the timeout value at step SC2. In detail, the timeout time acquisition unit 6 refers to the record of the server-side timeout table 4 based on the information on the storage apparatus 10 of the LUN information 7 and the disk 13 of the LUN. For example, when the LUN of the issuance destination of the IO is "E4000-6A0299" and the disk type is the "SSD", the timeout time acquisition unit 6 refers to the server-side timeout table 4 of FIG. 4 to acquire "10 seconds" as the timeout time of the first IO.

However, in the case of the storage apparatus 20 which does not have the timeout table 14 and may not set the timeout value from the outside (see the NO route of step SC1), the timeout time acquisition unit 6 refers to the record for default at step SC3 to acquire the timeout value thereof. For example, the timeout time acquisition unit 6 acquires "40 seconds" as the timeout time.

At step SC4, the timeout time acquisition unit 6 confirms whether another path which may issue the IO is present.

When another path which may issue the IO is present else (see the YES route of step SC4), the timeout time acquisition unit 6 determines whether the IO is a first try or a retry at step SC5.

When the IO is a first retry (see the YES route of step SC5), at step SC6, the timeout time acquisition unit 6 sets the timeout time of the leading path of the record referenced at step SC2 or SC3 in the IO. As described above, when the first IO is issued, the timeout time acquisition unit 6 uses the timeout time having the short leading path. Although the timeout time is short, the value is long enough not to be mis-detected as the timeout in the normal IO performance.

When the IO is the retry (see the NO route of step SC5), at step SC7, the timeout time acquisition unit 6 sets the timeout time of the intermediate path of the record referenced in step SC2 or SC3 in the IO. In this case, when the path 30 of the issuance destination of the IO is a path which goes through the standby CM 11, a value of the CM coefficient field 47 of the timeout table 14 is multiplied by the timeout time.

However, when another path which may issue the IO at step SC4 is not present, that is, in the case of the final path (see the NO route of step SC4), at step SC8, the timeout time acquisition unit 6 sets the timeout value of the final path of the record selected in step SC2 or SC3 in the IO. Even in this case, when the path 30 of the issuance destination of the IO is a path which goes through the standby CM 11, the value of the CM coefficient field 47 of the timeout table 14 is multiplied by the timeout time.

At step SC9, the IO issuance unit 8 issues the IO.

At step SC10, the IO issuance unit 8 receives the response of the IO which returns so as to determine whether an error other than the timeout occurs.

In the case of the error other than the timeout (see the YES route of step SC10), the IO issuance unit 8 retries the IO as needed at step SC11.

However, in the case of the timeout error (see the NO route of step SC10), in step SC12, the IO issuance unit 8 determines whether the timeout is made.

In the case of the timeout (see the YES route of step SC12), the IO issuance unit 8 determines at step SC13 whether there is an alternative path and the number of retries does not exceed the maximum retry frequency (the retry is out).

If there is an alternative path and the number of retries does not exceed the maximum retry frequency (see the YES route of step SC13), the IO issuance unit 8 returns to step SC4 so as to change the path and retry the IO at step SC14.

However, when there is no alternative path or the number of retries exceeds the maximum retry frequency at step SC13 (see the NO route of step SC13), the IO issuance unit 8 determines that the IO erroneously ends at step SC16.

When the timeout is not made at step SC12 (see the YES route of step SC12), the IO issuance unit 8 determines that the IO normally ends at step SC15.

Next, the processing when the timeout values of the disks 13 and 23 are updated, and the timeout table 14 of the storage apparatuses 10 and 20 is updated will be described with reference to FIG. 9.

As described above, the timeout table 14 may be updated in addition to the time of recognizing the storage apparatus 10 described with reference to FIG. 7. As such the case, there may be the case in which the firmware of the storage apparatus 10 is updated such that, for example, the storage apparatus 10 has the improved performance.

In this case, the storage apparatus 10 uses, for example, specific sense information to notify the multi-path driver unit 3 of the updating of the timeout table 14. The multi-path driver unit 3 uses, for example, the inquiry command to acquire the updated timeout table 14 and update the server-side timeout table 4.

Figure 9:
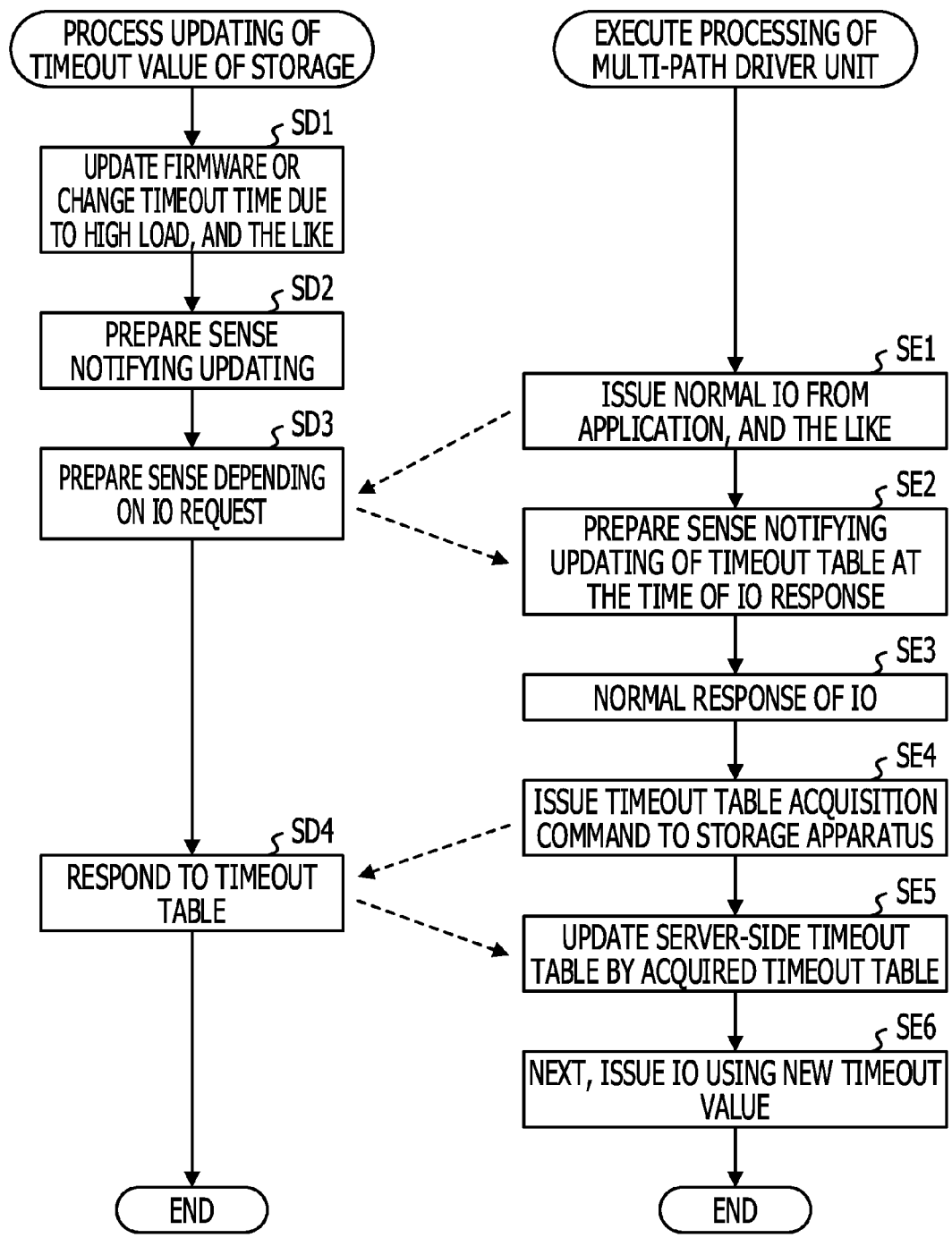
FIG. 9 is a flow chart illustrating updating processing for timeout values according to an example of an embodiment of the present disclosure.

FIG. 9 is a flow chart illustrating the updating processing of the timeout value as an example of the present embodiment (steps SD1 to SD4 and SE1 to SE6).

At step SD1, the timeout time changing unit 15 of the storage apparatus 10 updates the firmware or detects, for example, the resolving of the high load or the load of the disks 13 and 23, thereby changing the timeout value of the timeout table 14.

At step SD2, the timeout time changing unit 15 sets (prepares) the sense for notifying the server 2 of the updating of the timeout time.

As described above, the sense is a message used to notify the server 2 when the storage apparatuses 10 and 20 respond to the IO from the server 2. For this reason, the timeout time changing unit 15 of the storage apparatus 10 does not notify the server 2 of the updating of the timeout table 14 unless the IO is issued from the server 2.

At step SE1, the normal IO is issued from, for example, the applications of the server 2.

At step SD3, the timeout time changing unit 15 of the storage apparatus 10 makes the sense set at step SD2 respond to the server IO.

At step SE2, the IO issuance unit 8 of the server 2 receives the sense message, along with the response of the IO issued at step SE1.

At step SE3, the IO issuance unit 8 of the server 2 determines that the IO normally responds to and ends the processing of the IO.

At step SE4, the timeout table collection unit 5 of the server 2 issues the timeout table acquisition command to the storage apparatus 10.

At step SD4, the timeout time changing unit 15 of the storage apparatus 10 transmits the timeout table 14 after being updated to the server 2.

At step SE5, the timeout table collection unit 5 of the server 2 acquires the timeout table 14 and uses the acquired timeout table 14 to update the server-side timeout table 14.

At step SE6, the IO issuance unit 8 of the server 2 uses the updated timeout value to issue the IO.

(C) Modified Examples (C-1) First Modified Example

In the above-mentioned embodiment, the timeout times are set for each of the leading path, the intermediate path, and the final path.

However, as the first modified example of the above-mentioned embodiment, the processing may be simplified by arranging the leading path and the intermediate path illustrated in FIGS. 2 to 4 as "the case in which there is the alternative path".

FIG. 10 illustrates a server-side timeout table 204 when the leading path and the intermediate path are arranged as "the case in which there is the alternative path".

FIG. 10 is a diagram illustrating the server-side timeout table 204 in the first modified example of an embodiment of the present disclosure.

The server-side timeout table 204 has a timeout time field 48 in the case in which there is the alternative path, instead of a timeout time 44 of the leading path and a timeout time 40 of the intermediate path of the server-side timeout table 4 according to the embodiment of the present disclosure.

The timeout time field 48 in the case in which there is the alternative path stores the timeout times which are used in the paths other than the final path in the case of the multi-path environment.

The other fields of the server-side timeout table 204 are the same as those of the above-mentioned embodiment, and therefore the description thereof will be omitted.

Although not specifically illustrated, in the first modified example of the embodiment of the present disclosure as described above, the timeout table 14 of the storage apparatus 10 side also has the timeout time field in the case in which there is the alternative path, instead of the timeout time fields 144 to 145.

The timeout time acquisition unit 6 refers to the server-side timeout table 204 to set values set in the timeout time field 48 for the paths other than the final path, thereby issuing the IO. In the case of the final path, the IO is issued by using the values set in the timeout time field 46 of the final path.

(C-2) Second Modified Example

Alternatively, as the second modified example of the embodiment of the present disclosure, the timeout time acquisition unit 6 may use the server-side timeout table 204 of FIG. 10 and set the values set in the timeout time field 48 in the leading path to issue the IO. Further, a slightly long value may be set in an order of a second path, a third path and so on.

(C-3) Third Modified Example

Alternatively, as the third modified example of the embodiment of the present disclosure, only one timeout time of the server-side timeout table 4 may be set, instead of setting the plurality of timeout times in the server-side timeout table 4. In this case, the timeout time acquisition unit 6 may make the timeout time short by multiplying a coefficient depending on the number of remaining paths which may be retried. The multi-path driver unit 3 may independently have the coefficient.

(C-4) Fourth Modified Example

Figure 11:
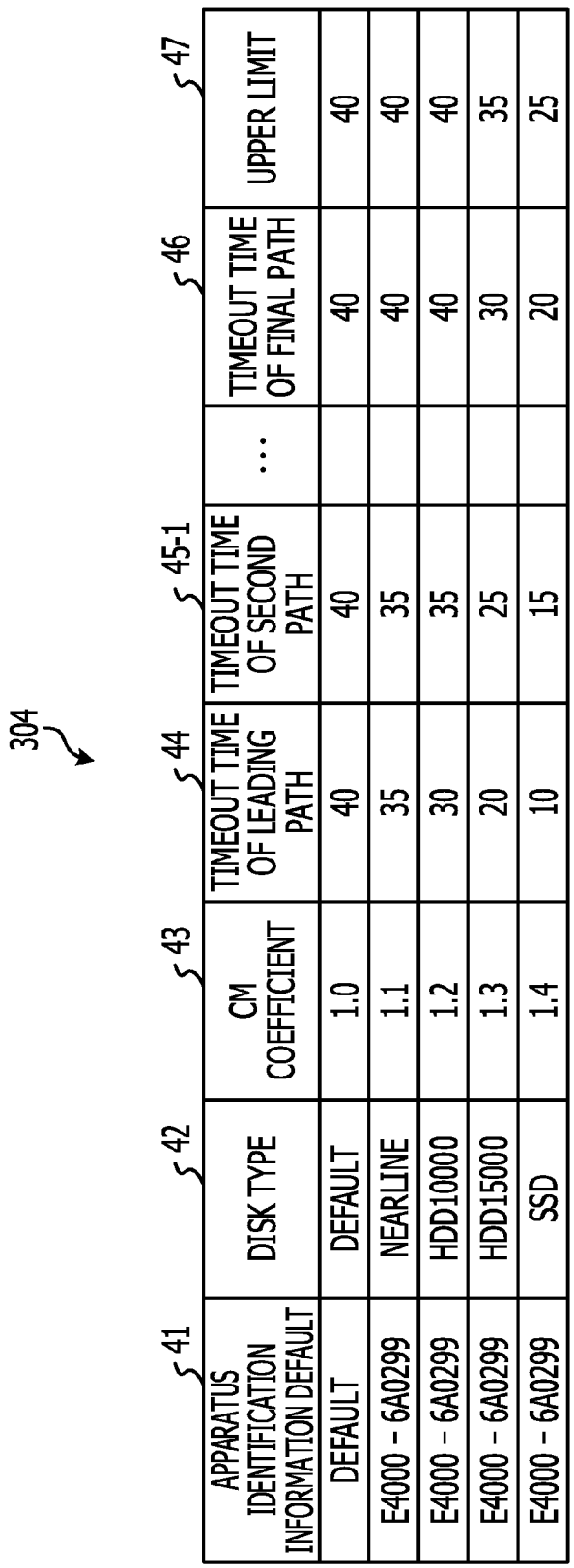
FIG. 11 is a diagram illustrating a server-side timeout table according to a fourth modified example of an embodiment of the present disclosure.

Alternatively, as the fourth modified example of the embodiment of the present disclosure, as illustrated in FIG. 11, timeout times of all the paths may be set in a server-side timeout table 304 in an order of a leading path, a second path, . . . , an N-th path (e.g., N is an integer of 2 or more).

FIG. 11 illustrates the server-side timeout table 304 in which the timeout times of all the paths are set.

FIG. 11 is a diagram illustrating the server-side timeout table 304 in the fourth modified example of the embodiment of the present disclosure.

The server-side timeout table 304 has timeout time fields 44, 45-1 to 45-(N−2), and 46 for each of the leading path, the second path, . . . , the N-th path.

(C-5) Fifth Modified Example

Depending on the storage apparatus 10, the LUN may be constructed as a plural kinds of storages. Example thereof may include LUN concatenation or thin provisioning. In the LUN concatenation or the thin provisioning, a plurality of RAID groups or a plurality of disk types is mixed in the single LUN.

Figure 12:
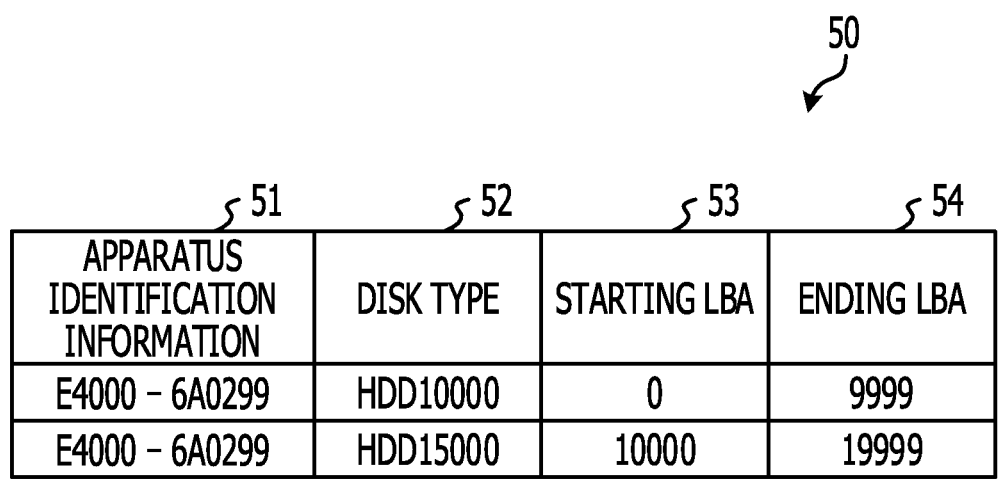
FIG. 12 is a diagram illustrating an LUN management table according to a fifth modified example of an embodiment of the present disclosure.
Figure 13:
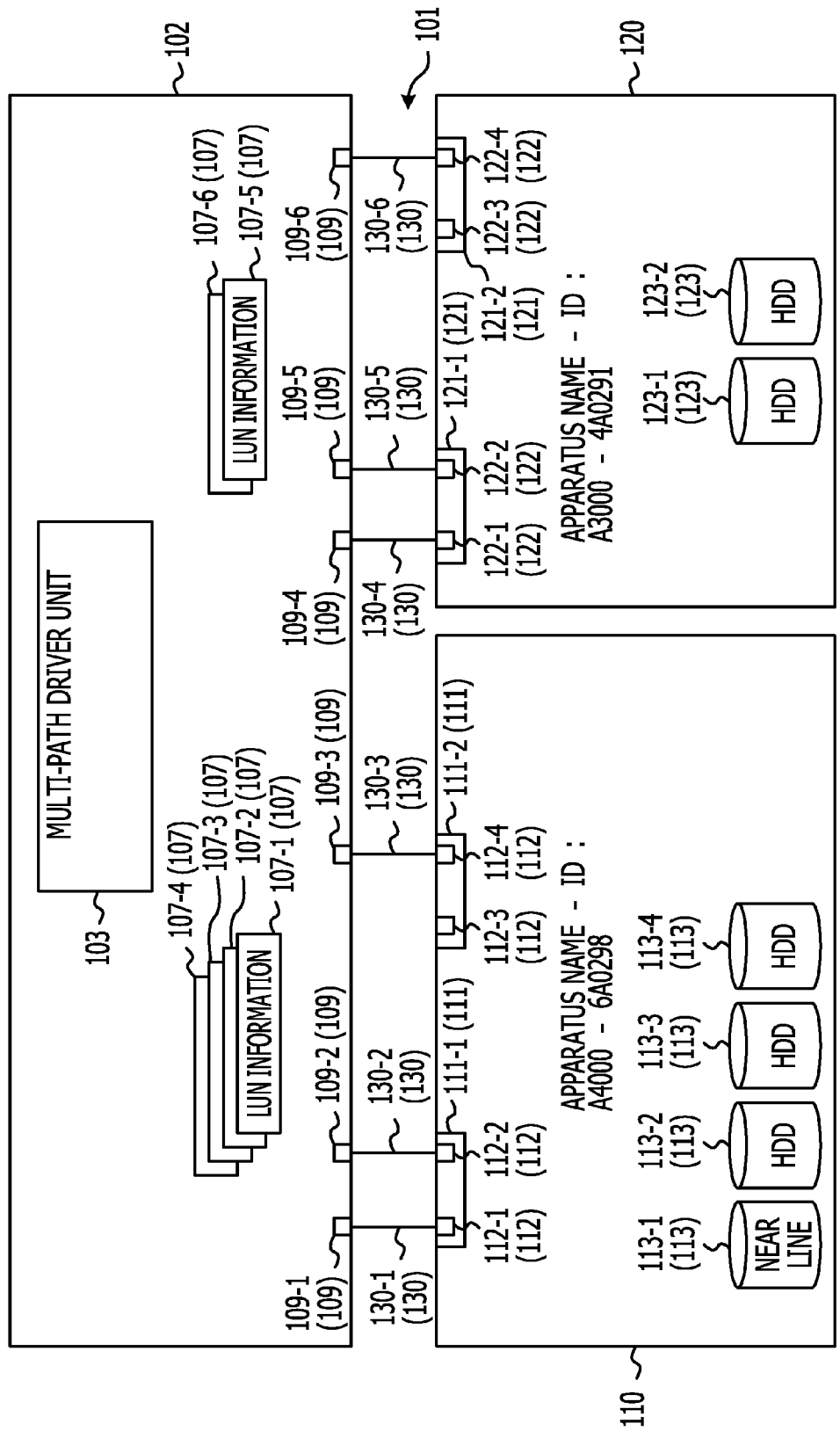
FIG. 13 is a diagram illustrating a storage system according to the related art.

Therefore, as the fifth modified example of the embodiment of the present disclosure, the multi-path driver unit 3 uses the inquiry command to acquire a logical block address (LBA) range, along with the disk type in an LUN unit from the storage apparatuses 10 and 20. Further, the multi-path driver unit 3 stores the acquired information in an LUN management table 50, as illustrated in FIG. 12. The LUN management table 50 is prepared for each LUN.

FIG. 12 is a diagram illustrating the LUN management table 50 in the fifth modification example of the embodiment of the present disclosure.

The LUN management table 50 has an apparatus identification information field 51, a disk type field 52, a starting LBA field 53, and an ending LBA field 54.

The apparatus identification information field 51 represents information identifying the storage apparatus 10. For example, the apparatus identification information field 51 is stored with a character string formed by connecting a model name and a serial number of the storage apparatus 10.

The disk type field 52 represents the disk type within the storage apparatus 10. For example, the disk type field 52 is stored with a character string which represents performance or characteristics of the disk, such as "HDD10000", "HDD15000", "SSD", and "NEARLINE". The "HDD10000" represents the HDD of which the rotating speed is 10,000 RPM and the "HDD15000" represents the HDD of which the rotating speed is 15,000 RPM. The "SSD" represents the SSD and the "NEARLINE" represents the nearline.

The starting LBA field 53 represents an LBA at the head of the disk of the disk type field 52.

The ending LBA field 53 represents an LBA at the end of the disk of the disk type field 52.

The timeout time acquisition unit 6 refers to the timeout table 4 and the LUN management table 50 to change the timeout time depending on the issuance position of the IO.

For example, an example is shown in which the LUN illustrated in FIG. 12 is concatenated by two kinds of disks 13 and 23 for each 10000 LBA.

In the example, the timeout time acquisition unit 6 uses the timeout value which is set in the HDD150000 in the case of the IO access within a range of LBA0 to LBA 9999. However, when there is an access in a range of LBA10000 to LBA19999, the timeout time acquisition unit 6 uses the timeout value which is set in the HDD10000.

In the case of the IO ranging from LBA9999 to LBA10000, the timeout time acquisition unit 6 uses the timeout value set in the HDD10000 having a long timeout time, thereby preventing the timeout from occurring even though the HDD10000 is slightly delayed.

(D) Effect

As described above, according to the example of an embodiments of the present disclosure and each modified examples thereof, when there is an alternative path in the multi-path environment, the IO is issued by setting the short timeout time at the time of issuing the IO from the server to the storage apparatus. When the timeout occurs in the IO, the path is switched to set the timeout time longer than the previous time so as to retry the IO, thereby shortening the IO response time. Therefore, when an abnormality occurs, the time until the error response or the path switching occurs may be shortened, thereby shortening the overall IO response time.

In detail, according to the example of an embodiments of the present disclosure and the modified examples thereof, when the information on the type of the disk 13 or the optimal IO timeout time is previously stored in the storage apparatus 10 and the server 2 recognizes the storage apparatus 10, the information is transferred to the server 2. Further, the timeout time acquisition unit 6 of the multi-path driver unit 3 acquires the optimal IO timeout time based on the timeout table 14 acquired from the storage apparatus 10 at the time of issuing the IO. Therefore, the multi-path driver unit 3 can set the optimal IO timeout time in consideration of the type of the disk 13 of the storage apparatus 10 and the number of remaining paths.

According to the example of an embodiments of the present disclosure and the modified examples thereof, since the timeout tables 4 and 14 have the CM coefficients 43 and 143, it is possible to appropriately set the timeout time in consideration of the performance of the CM (e.g., regarding whether to be the exclusive CM or not) of the storage apparatus 10.

According to the example of an embodiments of the present disclosure and the modified examples thereof, the timeout time changing unit 15 of the storage apparatus 10 detects, for example, the high load and/or the failure to set the timeout time of the timeout table 14 to be slightly longer. Therefore, it is possible to shorten the IO response time.

In this case, since the timeout time changing unit 15 uses the sense to notify the server 2 of the change in the timeout value, it is possible to suppress the increase of the network load at the time of updating the timeout value at the storage apparatus 10 side.

(E) Others

The disclosed technologies are not limited to the foregoing embodiments, and therefore can be carried out by being variously changed without departing from the scope of the embodiments of the present disclosure.

For example, according to the embodiments of the present disclosure and the modified examples thereof, the timeout correspondence/non-correspondence conditions or the timeout table 14 is acquired from the storage apparatuses 10 and 20 by using the inquiry command. However, the information may be acquired by using another command.

Alternatively, according to the embodiments of the present disclosure and the modified examples thereof, the CM coefficient is set depending on whether the CM is the exclusive CM or the non-exclusive CM, but the "path coefficient" may be set depending on whether the path is the exclusive path or the non-exclusive path when viewed from the server 2.

According to the embodiment of the present disclosure and the modified examples thereof, the timeout time changing unit 15 of the storage apparatus 10 uses the sense to notify server 2 of the fact that the timeout table 14 is updated. However, the updating may be notified by using another method. Further, the storage apparatus 10 may transmit the timeout table 14 to the server 2 as soon as the storage apparatus 10 updates the timeout table 14.

(F) Claims

The following claims are disclosed with reference to the above embodiment.

All examples and conditional language recited herein are intended for pedagogical purposes to aid the reader in understanding the disclosure and the concepts contributed by the inventor to furthering the art, and are to be construed as being without limitation to such specifically recited examples and conditions, nor does the organization of such examples in the specification relate to a showing of the superiority and inferiority of the disclosure. Although the embodiments of the present disclosure have been described in detail, it should be understood that the various changes, substitutions, and alterations could be made hereto without departing from the spirit and scope of the disclosure.

What is claimed is:

1. An information processing apparatus, comprising:
   a storage coupled to a storage apparatus via a plurality of paths and configured to store management information regarding a timeout time for each of the plurality of paths; and
   a processor configured to:
   acquire, for a path for an issuer of an input or output to the storage device and another path, the management information in accordance with each path from the storage;
   collect a plurality of input and output timeout times for the plurality of paths as the management information from the storage apparatus;
   acquire a first input and output timeout time for a first path among the plurality of paths; and
   acquire, when a timeout error occurs at the input and output to the first path, a second input and output timeout time longer than the first input and output timeout time, for a second path different from the first path among the plurality of paths.

2. The information processing apparatus of claim 1, wherein the processor configured to collect the management information and store the collected management information in the storage, and configured to issue the input and output to the storage apparatus by using the timeout time acquired by the processor.

3. The information processing apparatus of claim 1, wherein the first input and output timeout time is a timeout time for a path other than a final path among the plurality of paths, and
   the second input and output timeout time is a timeout time for the final path among the plurality of paths.

4. The information processing apparatus of claim 3, wherein the processor acquires a third input and output timeout time longer than the first input and output timeout time and shorter than the second input and output timeout time, for a third path different from the first and second paths among the plurality of paths, prior to issuing the input and output to the second path when a timeout error occurs at the input and output to the first path.

5. The information processing apparatus of claim 2, wherein the processor collects the plurality of input and output timeout times after being changed as the management information when the plurality of input and output timeout times is changed in the storage apparatus.

6. A storage apparatus, comprising:
a storage connected to an information processing apparatus via a plurality of paths and configured to store a plurality of input and output timeout times for the plurality of paths; and
a first processor configured to transmit the plurality of input and output timeout times to the information processing apparatus, when the plurality of input and output timeout times is required from the information processing apparatus,
wherein the first processor performs a read operation or a write operation of data, when a timeout error occurs at an input and output to a first path which is among the plurality of paths and has a first input and output timeout time, based on a second input and output timeout time longer than the first input and output timeout time for a second path different from the first path among the plurality of paths, the second input and output timeout time being acquired by a second processor of the information processing apparatus.

7. The storage apparatus of claim 6,
wherein the first processor changes the plurality of input and output timeout times depending on a condition of each of the plurality of paths, and
transmits the changed plurality of input and output timeout times to the information processing apparatus when receiving an input and output from the information processing apparatus.

8. An information processing system, comprising:
an information processing apparatus;
a storage apparatus connected to the information processing apparatus via a plurality of paths;
a storage configured to store management information for a timeout time of each of the plurality of paths; and
a processor configured to:
acquire from the storage a timeout time for a path and another path of input and output issuance destinations from the information processing apparatus to the storage apparatus;
collect a plurality of input and output timeout times for the plurality of paths as the management information from the storage apparatus;
acquire a first input and output timeout time for a first path among the plurality of paths; and
acquire, when a timeout error occurs at the input and output to the first path, a second input and output timeout time longer than the first input and output timeout time, for a second path different from the first path among the plurality of paths.

9. The information processing system of claim 8, wherein the processor configured to collect the management information and store the collected management information in the storage unit, and configured to issue an input and an output from the information processing apparatus to the storage apparatus by using the timeout time.

10. The information processing system of claim 8, wherein the first input and output timeout time is a timeout time for a path other than a final path among the plurality of paths, and
the second input and output timeout time is a timeout time for the final path among the plurality of paths.

11. The information processing system of claim 10, wherein the processor acquires a third input and output timeout time longer than the first input and output timeout time and shorter than the second input and output timeout time, for a third path different from the first and second paths among the plurality of paths, prior to issuing the input and output to the second path when a timeout error occurs at the input and output to the first path.

12. The information processing system of claim 9, wherein the processor collects the plurality of input and output timeout times after being changed as the management information when the plurality of input and output timeout times is changed in the storage apparatus.

13. An input and output method comprising:
storing, in a storage, management information for a timeout time of each of a plurality of paths between an information processing apparatus and a storage apparatus;
acquiring the timeout time of a path and another path of an issuance destination of an input and output for the storage apparatus from the storage;
collecting a plurality of input and output timeout times for the plurality of paths as the management information from the storage apparatus;
acquiring a first input and output timeout time for a first path among the plurality of paths; and
acquiring, when a timeout error occurs at the input and output to the first path, a second input and output timeout time longer than the first input and output timeout time, for a second path different from the first path among the plurality of paths.

14. A non-transitory computer-readable recording medium storing a computer executable program that, when executed, causes a computer to perform an input and output method comprising:
storing, in a storage, management information for a timeout time of each of the plurality of paths between an information processing apparatus and a storage apparatus;
acquiring the timeout time of a path and another path of an input/output issuance destination for the storage apparatus from the storage unit depending on the path and the another path;
collect a plurality of input and output timeout times for the plurality of paths as the management information from the storage apparatus;
acquire a first input and output timeout time for a first path among the plurality of paths; and
acquire, when a timeout error occurs at the input and output to the first path, a second input and output timeout time longer than the first input and output timeout time, for a second path different from the first path among the plurality of path.

* * * * *

UNITED STATES PATENT AND TRADEMARK OFFICE
CERTIFICATE OF CORRECTION

PATENT NO. : 9,092,144 B2
APPLICATION NO. : 14/088566
DATED : July 28, 2015
INVENTOR(S) : Kobashi It is certified that error appears in the above-identified patent and that said Letters Patent is hereby corrected as shown below:

In the claims

Claim 9, Column 22, Line 1

After "storage" delete "unit".

Signed and Sealed this
Eighth Day of December, 2015

Michelle K. Lee
*Director of the United States Patent and Trademark Office*